United States Patent
Campbell et al.

(10) Patent No.: US 9,129,446 B2
(45) Date of Patent: Sep. 8, 2015

(54) APPARATUS AND METHOD FOR OBJECT POSITIONING

(71) Applicant: Sony Computer Entertainment Europe Limited, London (GB)

(72) Inventors: Diarmid Archibald Campbell, London (GB); Thomas Lucas-Woodley, London (GB); Nicholas Andrew Lord, London (GB); William Oliver Sykes, London (GB)

(73) Assignee: Sony Computer Entertainment Europe Limited (GB)

( * ) Notice: Subject to any disclaimer, the term of this patent is extended or adjusted under 35 U.S.C. 154(b) by 102 days.

(21) Appl. No.: 13/960,378

(22) Filed: Aug. 6, 2013

(65) Prior Publication Data
US 2014/0049560 A1    Feb. 20, 2014

(30) Foreign Application Priority Data

Aug. 17, 2012    (GB) .................................. 1214712.0

(51) Int. Cl.
*G09G 5/00*    (2006.01)
*G06T 11/60*    (2006.01)
*G06T 7/00*    (2006.01)

(52) U.S. Cl.
CPC ............... *G06T 11/60* (2013.01); *G06T 7/0044* (2013.01); *G06T 2207/30204* (2013.01)

(58) Field of Classification Search
CPC . G06T 19/006; G06T 17/00; G06T 2219/004; G06T 2219/012

USPC ......... 345/632, 633, 634, 635, 636, 637, 418, 345/419, 420
See application file for complete search history.

(56) References Cited

U.S. PATENT DOCUMENTS

| | | | |
|---|---|---|---|
| 2006/0227417 A1* | 10/2006 | Grover | 359/462 |
| 2007/0098234 A1* | 5/2007 | Fiala | 382/120 |
| 2008/0027313 A1* | 1/2008 | Shachar | 600/424 |
| 2008/0242978 A1* | 10/2008 | Simon et al. | 600/426 |
| 2010/0183118 A1* | 7/2010 | Star-Lack et al. | 378/23 |
| 2010/0316259 A1* | 12/2010 | Liu et al. | 382/107 |
| 2011/0157179 A1 | 6/2011 | Fahn et al. | |
| 2011/0298824 A1* | 12/2011 | Lee et al. | 345/633 |
| 2012/0075343 A1* | 3/2012 | Chen et al. | 345/633 |
| 2012/0081394 A1* | 4/2012 | Campbell et al. | 345/633 |

OTHER PUBLICATIONS

Steinbis, John, et al., "3D Fiducials for Scalable AR Visual Tracking," IEEE International Symposium on Mixed and Augmented Reality, 2008, pp. 183-184.*
British Search Report for Application No. GB1214712.0 dated Jan. 17, 2013.

* cited by examiner

*Primary Examiner* — Xiao Wu
*Assistant Examiner* — Sarah Lhymn
(74) *Attorney, Agent, or Firm* — Lerner, David, Littenberg, Krumholz & Mentlik, LLP

(57) ABSTRACT

An entertainment device comprises an input, a marker detector and a failure boundary calculation processor. The input is operable to receive a captured image from a video camera. The marker detector is operable to detect a fiduciary marker within the captured image, and is also operable to estimate a distance and angle of the fiduciary marker. The failure boundary calculation processor is operable to calculate at least one of an additional distance and an additional angle from the currently estimated distance and angle of the fiduciary marker at which recognition of the fiduciary marker is assumed to fail.

9 Claims, 12 Drawing Sheets

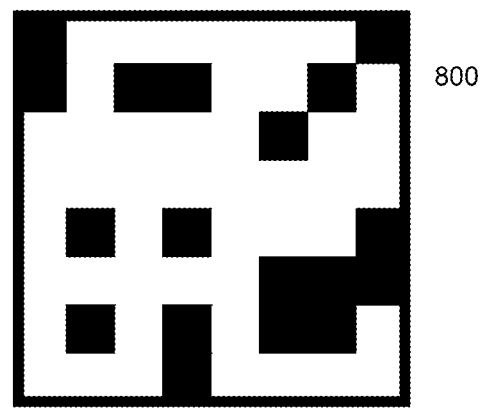
*Figure 1 – Prior Art*
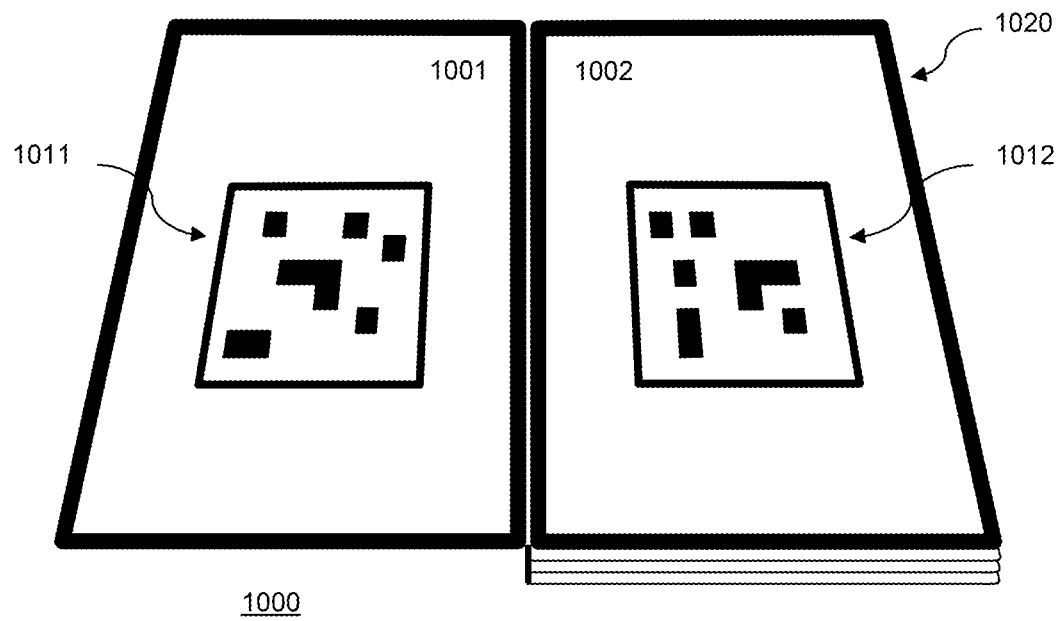
*Figure 2A*

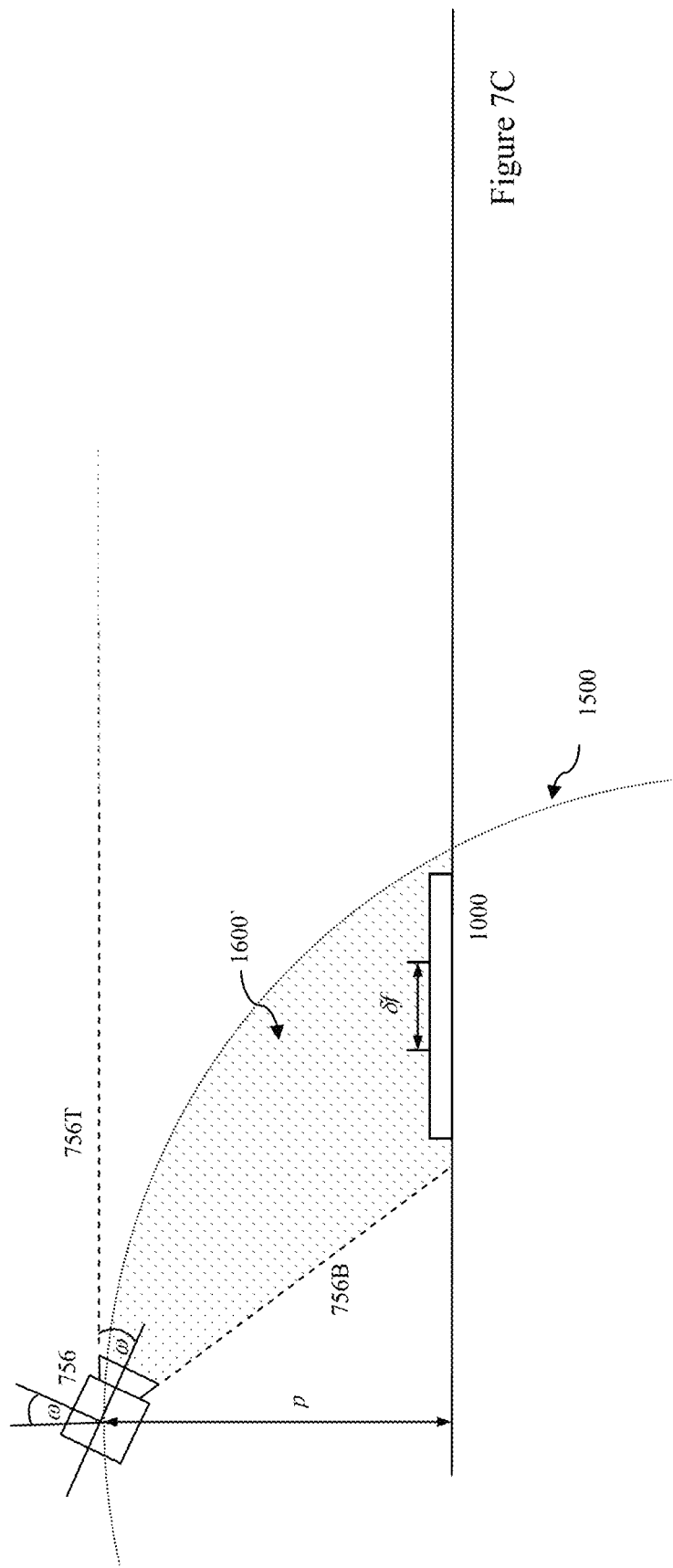

APPARATUS AND METHOD FOR OBJECT POSITIONING

CROSS REFERENCE TO RELATED APPLICATIONS

The present application claims the benefit of and priority to GB Application No. 1214712.0, filed Aug. 17, 2012, the entire disclosure of which is incorporated by reference herein.

BACKGROUND OF THE INVENTION

1. Field of the Invention

The present invention relates to an apparatus and method for object positioning.

2. Description of the Prior Art

Augmented reality systems are known that use a video camera coupled to a computer to capture a video image, detect features of that captured video image, and then in response to the detected to features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter).

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of the colour found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

In a first aspect, an entertainment devices is provided that includes an input operable to receive a captured image from a video camera, a marker detector operable to detect a fiduciary marker within the captured image and operable to estimate a distance and angle of the fiduciary marker, and a failure boundary calculation processor operable to calculate at least one of an additional distance and an additional angle from the estimated distance and angle of the fiduciary marker as a failure boundary at which recognition of the fiduciary marker is assumed to fail. The failure boundary comprises a video camera frustrum and a circle having a diameter equal to a maximum distance at which the fiduciary marker can be recognised. The circle intersects an image plane of the video camera and having an angle with respect to the image plane of the video camera that is the same as that of the fiduciary marker.

In another aspect, a method for object positioning is provided comprises the steps of receiving a captured image from a video camera; detecting a fiduciary marker within the captured image; estimating a distance and angle of the fiduciary marker; and calculating at least one of an additional distance and an additional angle from the estimated distance and angle of the fiduciary marker as a failure boundary at which recognition of the fiduciary marker is assumed to fail. The failure boundary comprises a video camera frustrum and a circle having a diameter equal to a maximum distance at which the fiduciary marker can be recognised. The circle intersects an image plane of the video camera and having an angle with respect to the image plane of the video camera that is the same as that of the fiduciary marker.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 is a schematic diagram of a prior art fiduciary marker.

FIG. 2A is a schematic diagram of a book comprising a fiduciary marker, in accordance with an embodiment of the present invention.

FIG. 7C is a schematic diagram of a fiduciary marker located within a boundary, in accordance with an embodiment of the present invention.

DESCRIPTION OF THE PREFERRED EMBODIMENTS

An apparatus and method for object positioning are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Fiduciary Markings in a Book

Figure 2B:
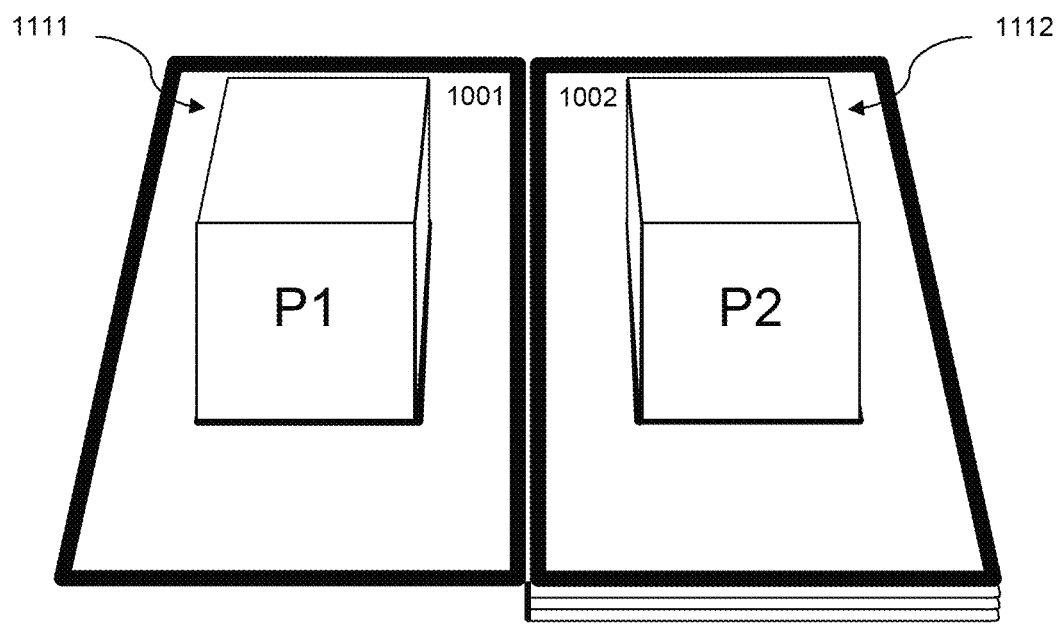
FIG. 2B is a schematic diagram of an image of a book augmented in accordance with to an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with virtual graphic elements 1111, 1112 corresponding to the placement, scale and orientation of the fiduciary markings 1011, 1012 on the visible pages, and output the augmented video image for display. In this way the displayed version of the book becomes a 'magic' pop-up book in which the pages can come to life.

Entertainment Device

Figure 3:
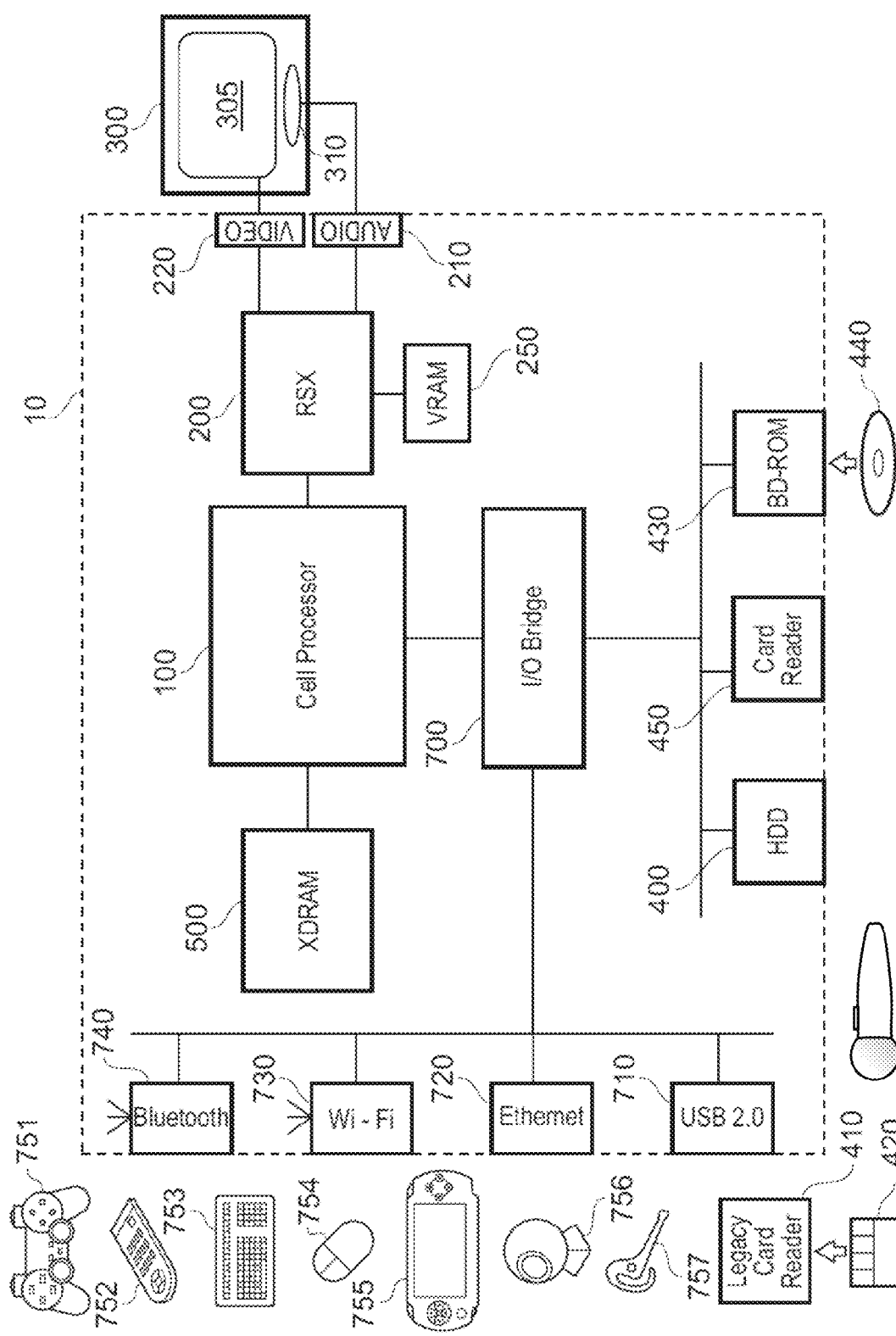
FIG. 3 is a schematic diagram of an entertainment device in accordance with an embodiment of the present invention.

FIG. 3 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through to the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 to or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Page Turning

Figure 4:
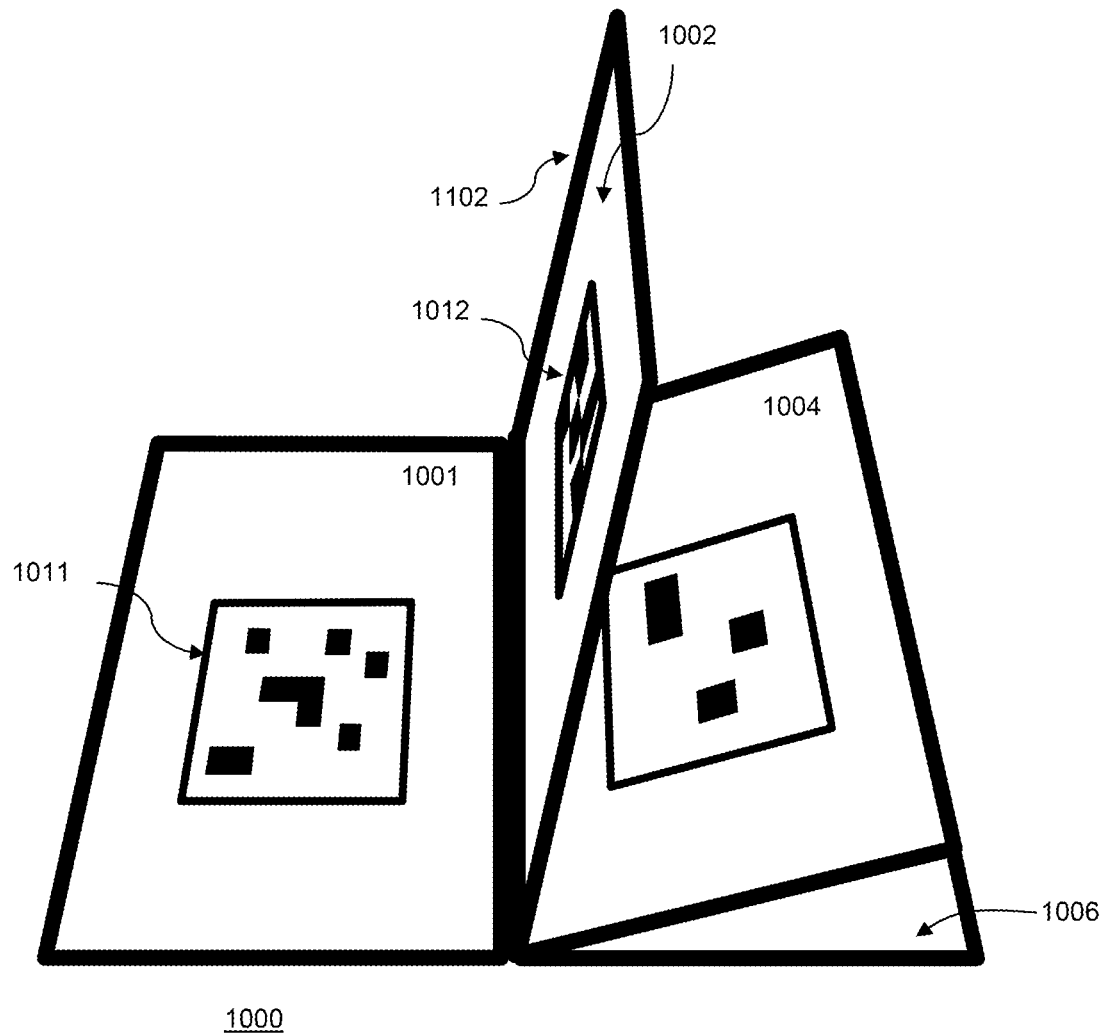
FIG. 4 is a schematic diagram of a book comprising a fiduciary marker, in accordance with an embodiment of the present invention.

Referring now to FIG. 4, it will be appreciated that whilst the fiduciary markers may be readily detected when the book is laid open and flat, problems may arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a problem that arises is that during the process of turning these pages there comes a point where the fiduciary marker 1012 on page 2 (for example) becomes so distorted by being to viewed nearly edge-on to the camera that it is no longer recognisable by the entertainment device. At this point it becomes preferable to use an alternative technique of determining the position of the turning leaf of the book so that any animations dependent upon it (for example a pop-up animation showing objects between pages 1 and 2 folding down, or unfolding between pages 3 and 4) are able to continue appropriately.

Such a technique is described in co-pending European application 10175548.6, incorporated herein by reference. A brief summary of the technique is described below with reference to FIG. 5.

In a first step s10, a scene comprising the book is captured by a video camera or similar image capture device operably coupled to an image input of the PS3 (such as a USB port), resulting in an image including the book. As noted previously, the book itself comprises substantially rigid leaves.

In a second step s20, the PS3 attempts to detect fiduciary markings in the image (i.e. those visible in the book), for example using the Cell processor operating under suitable software instruction as a marker detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts at the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof, as may the dimensions of the book and the expected positions of the markers therein.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Thus as a non-limiting example, hypotheses for page positions in the range 10 to 170 degrees may be to generated at increments of 4 degrees. Again here the Cell processor may operate as the hypothesising means.

To provide a basis of comparison with these hypotheses, in a fifth step s50 the captured image is processed to generate an image in which edges are identified. In addition data indicating the directions of these edges can be generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and optionally the directions of these edges using one of several possible scoring criteria, such as a distance-based criterion that generates a score proportional to how close an identified edge is to a hypothesised edge. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position and orientation consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Figure 5:
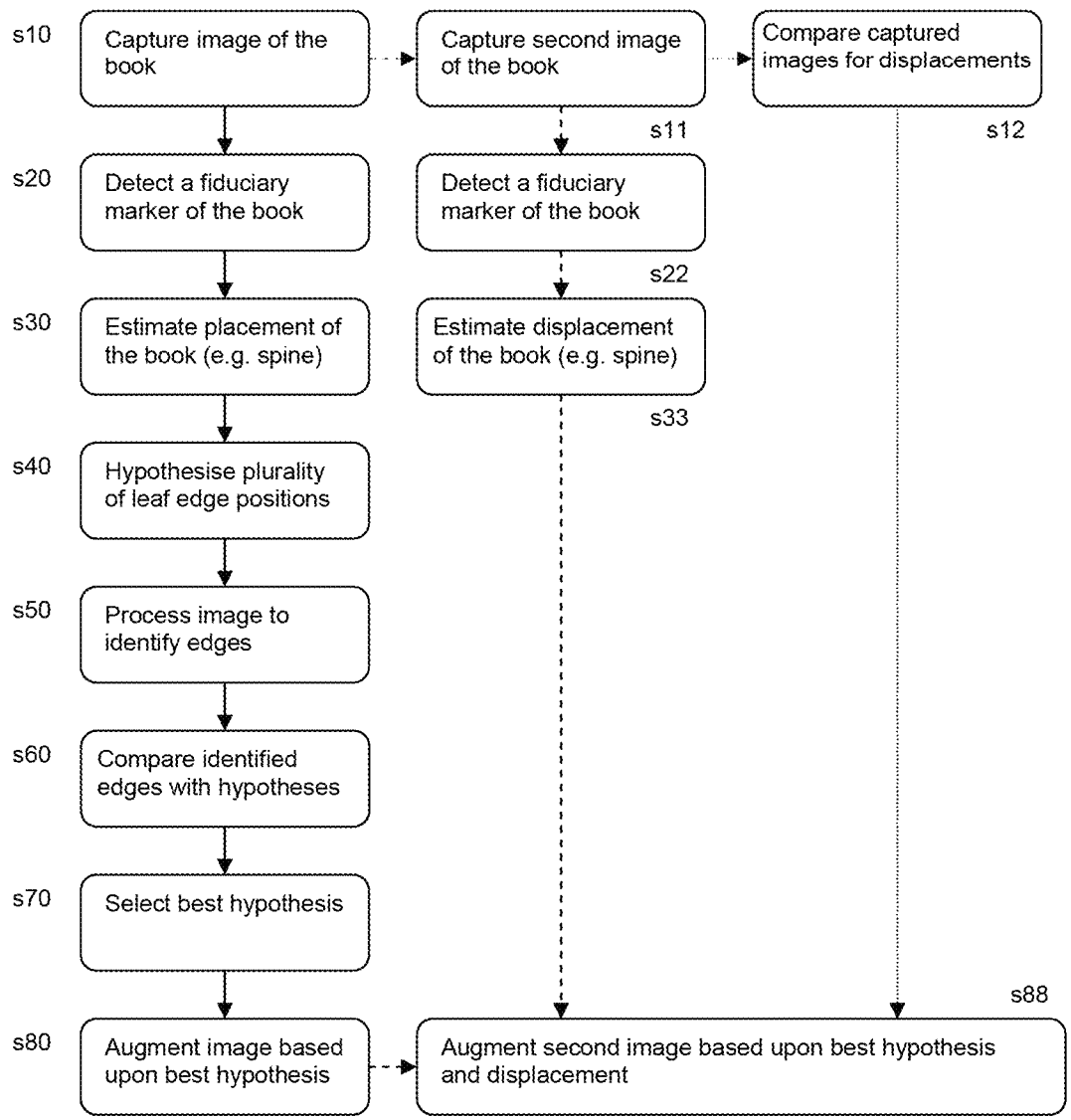
FIG. 5 is a flow diagram of a method of tracking the turning of a leaf of the book, in accordance with an embodiment of the present invention.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for to example by the Cell processor. In either case, this enables 3D augmentation for a stereoscopic display.

It will be appreciated that the above steps need not necessarily all be implemented in the above order. For example, the fifth step s50 may occur immediately after the first step s10.

It will also be appreciated that the initial hypothesis set may be distributed in a non-linear fashion, with a higher density of hypotheses near an expected position for the turning leaf (e.g. as predicted from the rate of turn in the last N video frames). Similarly within the selected range a number of prime hypotheses (such as the previously wining hypothesis from the previous frame) may be made the centre of a higher density of hypotheses.

It will be further appreciated that in the fourth to sixth steps of FIG. 5, different specific implementations of the hypothesis, comparison and scoring processes are envisaged within the scope of the invention. For example, the hypothesis may be bounded by a constraint model that takes other visible information into account—hence if for the current orientation of the book a given fiduciary marker is visible, the precludes the turning leaf from being at an angle that would result in it occluding that fiduciary marker from the camera. Similarly, the comparison may use different metrics—hence for example, the distance between hypothesised and observed edges may be calculated using so-called Chamfer matching. Finally, the scoring may be implemented on a whole-hypothesis basis or on a per-edge basis, and may or may not include direction-matching components for lines or line fragments in the edge-processed image.

Resolving the Fiduciary Marker

Whilst turning a leaf of the book neatly illustrates the problem that at certain angles the fiduciary markers on a page become difficult to resolve, it will be appreciated that this is a more general problem with the book as a whole.

A system comprising an entertainment device coupled to a video camera will have a finite image resolution, meaning that there will be positions for the book in the environment where the resolution of the fiduciary marker within the captured image will be too small to reliably resolve.

More generally the same will be true of the book itself, if treated as a fiduciary marker or object for tracking in its own right.

In an embodiment of the present invention, a fiduciary marker needs to have dimensions greater than or equal to 21 pixels in a captured image in order to be resolved with an acceptable level of reliability. It will be appreciated that this value reflects the chosen complexity of the fiduciary markers and also the optics of the Playstation Eye, and hence should be taken as a wholly non-limiting example. Simpler markers, for example, may be resolvable with fewer pixels, whilst more complex ones may need more pixels.

The Appearance of the Open Book

Figure 6:
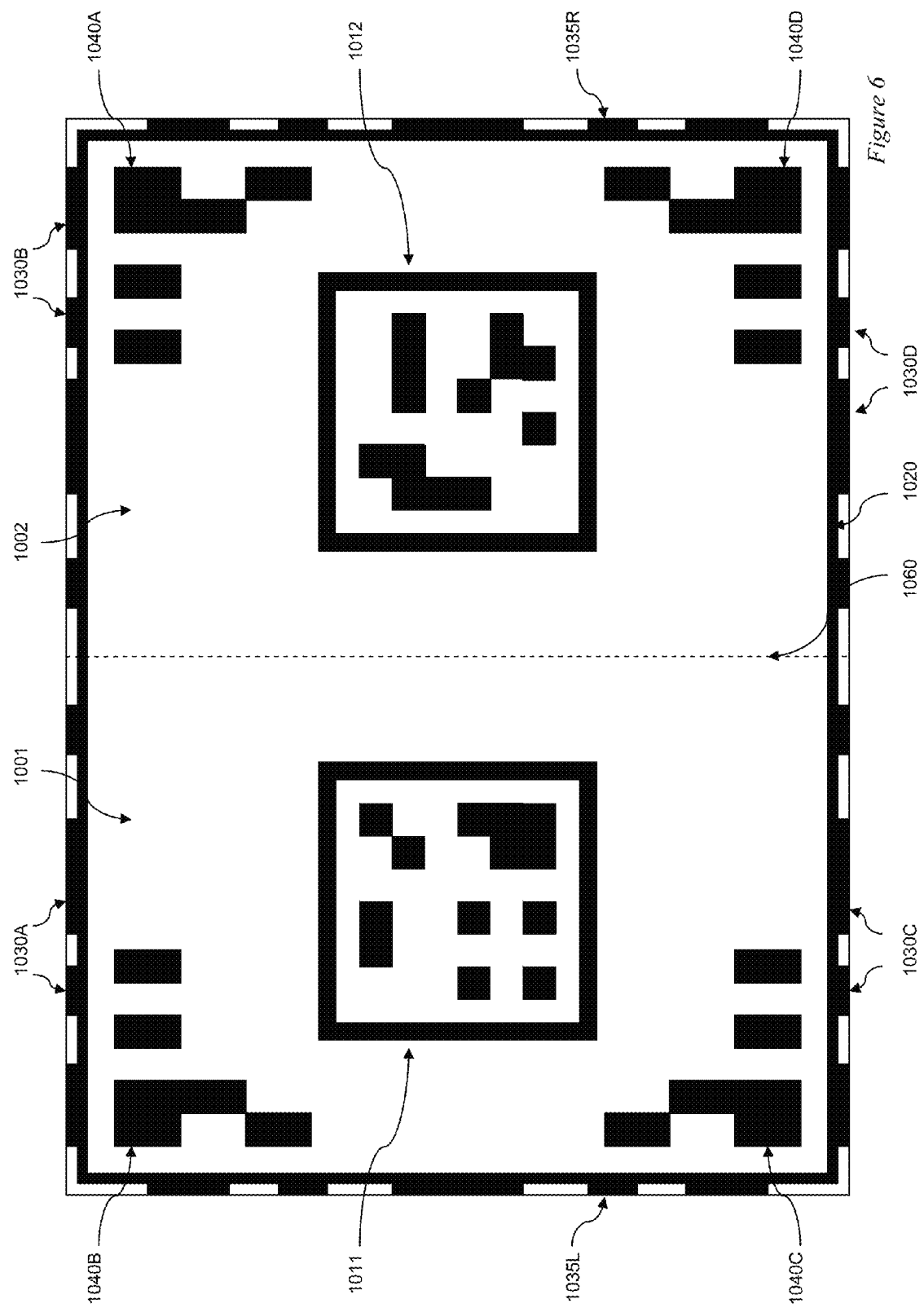
FIG. 6 is a schematic diagram of a two-page spread of a book, in accordance with an embodiment of the present invention.

FIG. 6 provides a more detailed illustration of the markings typically visible in an embodiment of the book.

As illustrated in FIG. 6, in an embodiment of the present invention each page (1001, 1002, etc.) comprises at least one respective fiduciary marker (1011, 1012) positioned substantially in the middle of the page, as described previously.

The middle may be considered to be an area of the page a predetermined distance from the outside edges of the page, the predetermined distance lying for example in the range 4 centimeters to 10 centimeters for a typical A4 size book. The purpose of this spacing is to reduce the scope for fingers or thumbs to occlude some or all of the fiduciary marker when holding the book in normal use; hence more generally the predetermined distance may be the average length of the thumb of a user amongst the target audience for the book. As result, if it is desired to maximise the size of the fiduciary marker within this middle area, then assuming that the marker is either square or a quadrilateral with an aspect ratio similar to that of the pages, it is preferable to orient it substantially in alignment with the edges of the page.

The fiduciary markers may therefore be positioned exactly centrally with respect to a page, or, in an embodiment of the present invention are offset laterally toward the spine of the book 1060 (which lays between opposing pages when the book is fully open and flat). In this case the offset may typically be in the order of 1 to 5 cm, though other offsets may be envisaged depending on to the size of the book.

Each fiduciary marker on these pages comprises a different respective asymmetric pattern capable firstly of indicating the scale and orientation of the book to an augmented reality application, as described above, and secondly of indicating the respective page (i.e. which page of the book it is). It will be appreciated that an augmented reality application operable with the book will hold reference or template copies of each fiduciary marker, and that each marker will be associated with a particular page of the book. Consequently identification of a marker also identifies the page it is printed on or attached to.

In addition, on each page a non-alphanumeric pattern (1040A, 1040B) is positioned closer to an outside edge of the page of the book than the fiduciary marker. Typically, this non-alphanumeric pattern is positioned between the fiduciary marker and the edge of the page that, in normal use, is furthest from the user of the book. This edge is thus also closest to the video camera for the most typical usage of the book, in which the video camera is positioned close to the TV on which the augmented images are to be displayed, and the user is facing the TV. The non-alphanumeric pattern can similarly be positioned between a corner of the fiduciary marker and the corner of the page formed by the further page edge from the user and the lateral outside page edge (the left or right outside page edge, depending on the page), as illustrated in FIG. 6.

Notably, the non-alphanumeric pattern can thus form an 'L' shape (i.e. follow the outer edge of the book around the corner). In this case the non-alphanumeric pattern is therefore positioned closer to both edges than the fiduciary marker.

This non-alphanumeric pattern is capable in principle of indicating at least the opposing page pair (e.g. pages 1 and 2 as illustrated in FIG. 6) comprising the respective page on which the non-alphanumeric pattern is positioned. Hence in the illustrated example, the non-alphanumeric pattern is unique to the pair of pages 1 and 2. Optionally, the non-alphanumeric pattern could be unique to a single page, but this could potentially require a more complex pattern as it doubles the number of unique patterns required in the book.

Because of its position closer to the edge of the book, the non-alphanumeric pattern of a given page is revealed earlier in the process of turning the leaf or leaves above it. This allows appropriate augmentation of the page as it is revealed before it is identified using the centrally positioned fiduciary marker.

Notably, unlike the fiduciary marker, the non-alphanumeric pattern is not needed to initially determine the position, scale or orientation of the book. As a result the non-alphanumeric pattern can in principle be ambiguous in terms of scale or orientation, as these aspects of the pattern can be resolved with reference to the fiduciary markers in the book.

Instead, the non-alphanumeric pattern relies on disambiguation of its scale and orientation by reference to a visible fiduciary marker. For example, referring back to FIG. 4, if a non-alphanumeric pattern was revealed in the corner of page 6 (reference no 1006 in FIG. 4) then its scale and orientation may be determined by reference to the fiduciary marker 1011 on page 1 in the illustrated example, and also any optional book tracking algorithm based upon the page edges 1020.

Notably therefore the non-alphanumeric pattern can be arranged on opposing pages as a mirror image about the spine of the book as shown in FIG. 6 to appear more pleasing to the user, without affecting its functionality.

It will be appreciated that the non-alphanumeric pattern can also be mirrored about a centre line between the two outside edges of the page (i.e. the top and bottom edges, as the left or right edge does not have a corresponding opposite outside edge but instead ends at the spine).

Consequently a two-page spread may have four copies of the same non-alphanumeric pattern 1040A-D, each rotated by 90 degrees to another, and having a rotational symmetry about the midpoint of the spine of the book.

This means that if the user of the book holds it upside-down, a copy of the non-alphanumeric pattern will still be visible to the camera for the purpose of early indication of the newly revealed page(s).

In addition to the markings on the leaves of the book, in an embodiment of the present invention to the book has a cover having larger dimensions than the leaves of the book, and hence having extremities that extend beyond the outer edges of each page when viewed from above as in FIG. 6.

The cover comprises a high contrast pattern along at least a first such extremity (1030A). It will be appreciated that the pattern is thus printed on the inside cover at and near to the outer edge of the cover.

As with the non-alphanumeric pattern, the pattern may be mirrored about the spine (and hence appear on the inside front and back covers) and may also be mirrored about a centreline between the top and bottom of the pages, to form four copies of the high contrast pattern (1030A-D). The pattern may encode information about the book (for example a title number) or may simply be random. A typical high contrast pattern may encode in the order of 6 to 20 bits. The light and dark elements of the pattern may adhere to a regular spacing scheme or have arbitrary spacing.

In addition, a high contrast pattern (1035L,R) may also be positioned along the lateral extremities of the book. This high contrast pattern may be the same as the high contrast pattern mentioned above, or may encode the same information in a different way, or encode different or additional information, or be random.

In any of the above cases, it will be appreciated that the covers have a predetermined thickness. Consequently, in an embodiment of the present invention, the high contrast pattern extends over the edge of the cover and across at least a predetermined proportion of the thickness of the cover, to improve its visibility at very acute angles with respect to the video camera.

Practical Limits on the Positioning of the Book

Figure 7A:
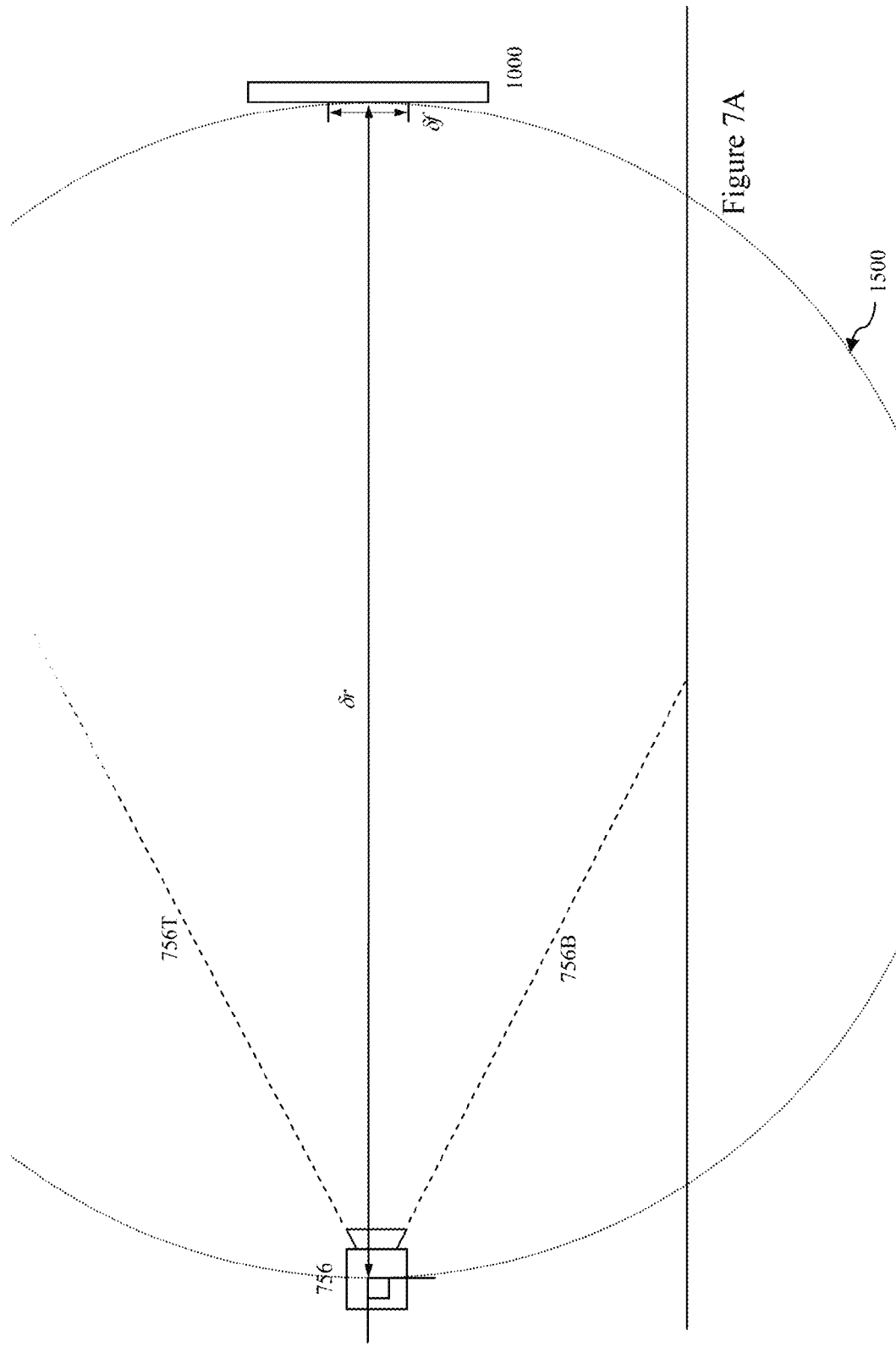
FIG. 7A is a schematic diagram of a boundary position for a fiduciary marker, in accordance with an embodiment of the present invention.

Referring now to FIG. 7A, then as noted previously herein the desirability to resolve the fiduciary marker places a practical limit on the distance that the fiduciary marker can be held from the camera. Hence for a given camera this maximum distance δr will be a function of the camera resolution and optics, and also the apparent size δf of the fiduciary marker (in addition to other possible factors such as fiduciary marker complexity, as discussed previously).

More generally, δr represents a distance along the optical axis of the camera at which a fiduciary to marker with dimensions of at least δf is resolvable. A fiduciary marker at this distance and parallel to the image plane of the camera should thus be resolvable.

Figure 7B:
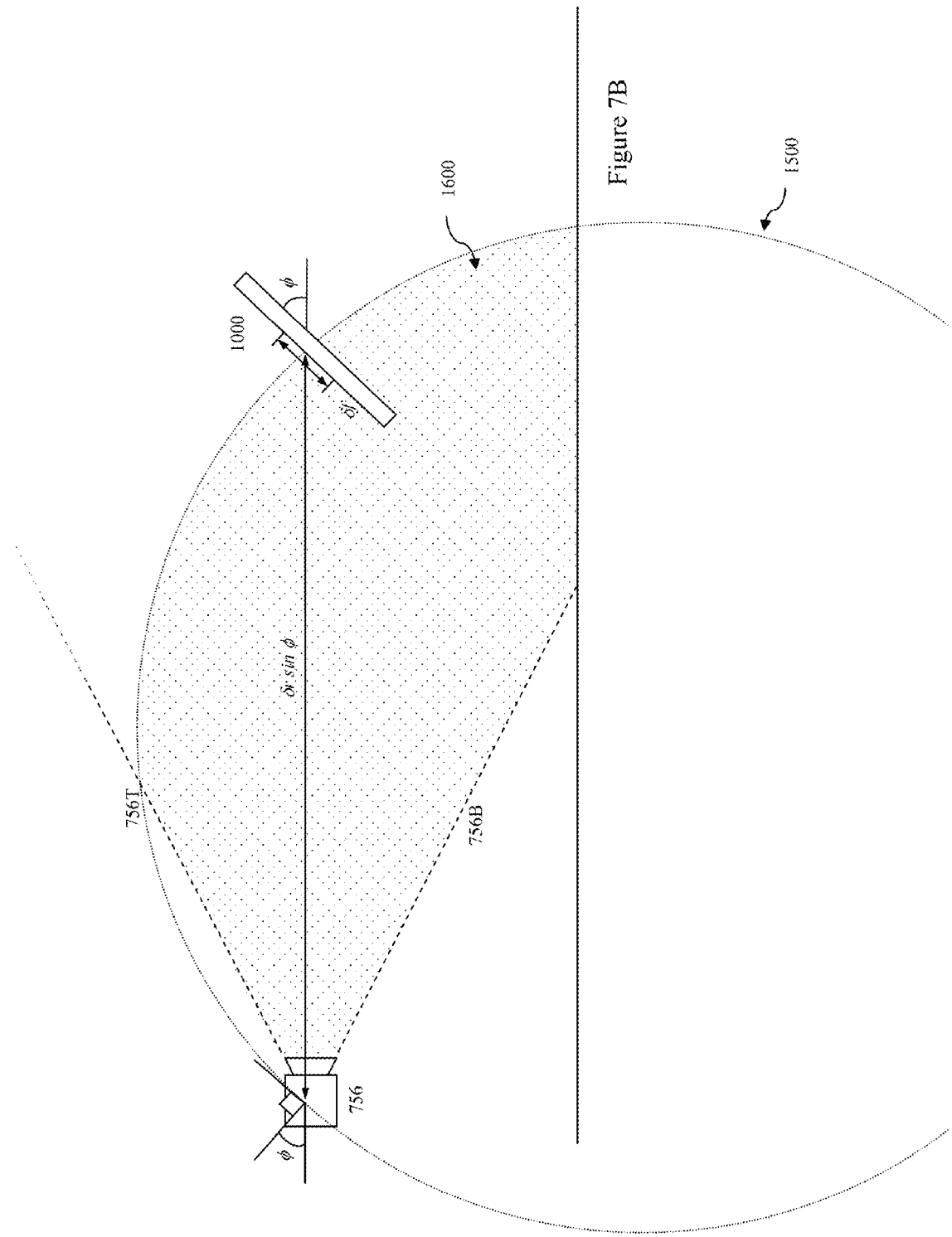
FIG. 7B is a schematic diagram of a boundary position for a fiduciary marker, in accordance with an embodiment of the present invention.

However, referring now also to FIG. 7B, for a fiduciary marker that is positioned at an acute angle φ to the camera instead of parallel to it, the apparent dimension of the angled marker is δf sin φ. This will be less that δf and so the resolvable distance δr decreases proportionally, i.e. also by a factor sin φ.

Notably, this is effectively the same as saying that the marker should lie no further than the boundary of a circle 1500 (or in three dimensions, a sphere) having a diameter δr, positioned with an edge or surface co-incident with the image plane of the camera, and angled with respect to the image plane in the same way that the fiduciary marker is angled with respect to the image plane. The line thus defines a chord of the angled circle between the camera and the book.

This is illustrated in FIGS. 7A and 7B by the circle 1500, having a diameter δr. In FIG. 7A, the circle is oriented tangential or parallel to the image plane (i.e. at 90° with respect to the optical axis of the camera, the same as the book and fiduciary marker), whilst in FIG. 7B it is pivoted by φ degrees, again the same as the book and fiduciary marker. Hence in FIG. 7A the resolvable distance or chord length is δr sin 90°=δr, whilst in FIG. 7B the resolvable distance or chord length is δr sin φ.

More generally therefore, it will be understood that for the current book angle φ, the fiduciary marker will be resolvable if the book is placed at any position within the space 1600 bounded by the frustrum or field of view of the camera (shown in FIGS. 7A and 7B as dotted lines 756T, 756B) and the circumference of a notional circle or sphere 1500 having a diameter equal to the maximum resolvable distance of the marker from the camera and that is angled parallel with the book and intersecting the imaging plane of the camera.

A brief consideration of FIG. 7B will show that for the present configuration of the camera, there is no position where the book can be placed on the floor so that the fiduciary marker is visible. Either the camera's height or angle need to be changed in order to move its field of view.

Hence in FIG. 7C, the book correctly lies within the space 1600' bounded by the field of view to (756T, 756B) of the tilted camera and the notional circle 1500. Here, the field of view of the camera is itself a function of the camera's height p and angle ω. In this case, the book is horizontal (flat) on the floor and hence has an angle ω relative to the image plane of the camera. The notional circle 1500 intersects the image plane of the camera at the same angle (i.e. also horizontally in absolute reference co-ordinates), and at an angle of ω relative to image plane of the camera.

Hence, given the current (or last known) angle of the fiduciary marker in the book with reference to the image plane of the camera, and the maximum distance at which a fiduciary marker is resolvable when parallel with the image plane of the camera, it is possible to calculate the boundary of a space within which the fiduciary marker will be resolvable by the system based upon the bounds of the field of view (in turn a function of camera position and angle) and the notional circle (in turn a function of the angle of the fiduciary marker and the maximum distance).

Consequently, in an embodiment of the present invention, the entertainment device estimates the relative position and orientation of the fiduciary marker in the book with respect to the camera, and determines whether that position is close to the boundary of the resolvable space (1600, 1600) described above. In an embodiment of the present invention, the entertainment device then detects whether overall movement in any direction (i.e. displacement of the book) would take the book out of the bounded space, and/or whether a change in orientation of the book in any direction would change the boundary of the space (i.e. circle 1500) such that the book was now outside the boundary. These checks may be performed for threshold amounts of displacement/angular change. These thresholds therefore define a warning or buffer region adjacent to the periphery of the space, indicative of physical positions where small changes to the position or orientation of the book (i.e. less than the thresholds) may cause the entertainment device to fail to recognise the fiduciary marker.

The entertainment device can then respond, for example by further augmenting the image with warnings, or instructions to move the book in an appropriate manner to take it out of a position within the buffer region of the bounded space.

The above process can be expressed more formally as follows with reference to FIG. 8.

In an embodiment of the present invention, the entertainment device tests for whether one or more of the following failure cases are imminent:
 a marker becoming too small due to its angle with respect to the camera;
 a marker becoming too small due to its distance from the camera; and
 a marker becoming clipped by the viewing frustrum (i.e. exiting the field of view of the camera).

Figure 8:
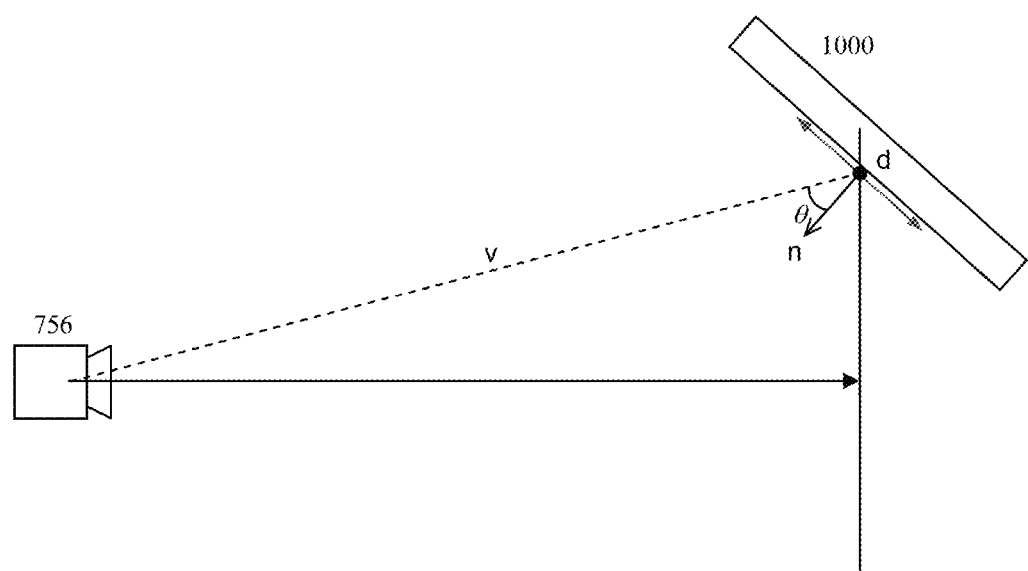
FIG. 8 is a schematic diagram of a fiduciary marker and a camera, in accordance with an embodiment of the present invention.

Referring to FIG. 8, the book with the fiduciary marker lies at a distance v from the camera and the fiduciary marker has a normal n forming an angle θ with the vector between the camera and the fiduciary marker. It will be appreciated that the angle θ is thus dependent upon the relative positions of the fiduciary marker and camera, and hence is itself a consequence of the position and angle of the camera and the position and angle of the fiduciary marker. The fiduciary marker itself has a diameter (or for a square fiduciary marker, sides) of length d.

For the system to operate reliably, the fiduciary marker should not be smaller than some minimum size in the captured image. This size can be called M, pixels. A non-limiting example value is 21 pixels.

It is then desirable to generate the following functions:
 maxDist($M_s$, d, θ)
 maxAngle($M_s$, d, v)

In other words, firstly, if the fiduciary marker is at some angle θ, what is the furthest it can be moved from the camera before it becomes too small, and similarly secondly, if the fiduciary marker is at some distance v from the camera, what is the maximum angle it can be turned to before it becomes too small.

For a particular camera, the size of the viewing plane may be computed. Hence for the example of the Sony PlayStation Eye®, the vertical field of view can be vfov=49.4°.

One can then calculate verticalFieldOfViewComponent, c, which is the height of the viewing plane in meters at 1 meter away from the camera.

$$c = 2\tan\left(\frac{vfov}{2}\right)$$

One can then calculate sizeOfViewingPlane=v c

Then given the sensor height, h=480 pixels (for the example of the Playstation Eye), the number of meters per pixel across the viewing plane is then calculated as $$pixelsPerMetre = \frac{h}{sizeOfViewingPlane}$$

The size of the fiduciary marker projected onto the viewing plane is projectedMarkerSize=$d \cos(\theta)$ and so the size on the camera sensor is sizeOnSensor=projectedMarkerSize·pixelsPerMeter Substituting gives:

$$sizeOnSensor = \frac{hd\,\cos(\theta)}{vc}$$

Renaming sizeOnSensor as s and rearranging:

$$s = \frac{hd\cos(\theta)}{vc}$$
$$v = \frac{hd\cos(\theta)}{sc}$$
$$\theta = \cos^{-1}\left(\frac{svc}{hd}\right)$$

maxDist($M_s$, d, $\theta$) and MaxAngle($M_s$, d, v) can then be computed by substituting $M_s$ for s in the above two equations. That is to say:

$$maxDist = \frac{hd\cos(\theta)}{M_s c}$$
$$maxAngle = \cos^{-1}\left(\frac{M_s vc}{hd}\right)$$

In order to use these values to provide a warning to the user that the current configuration of the book is approaching either the maxDist, or the maxAngle, or both, further considerations may be made.

As the book is moved further from the camera, the set of allowable angles decreases. Consequently there reaches a point where there is an allowable distance but only one allowable angle (effectively as illustrated in FIG. 7A). It is preferable therefore to set a distance warning before this situation arises.

It is similarly possible to have an angle that is acceptable, but which does not permit moving the book further backwards. In this case it is again preferable to set an angle warning before this situation arises.

Hence warnings may relate to the validity of the distance or angle itself, and/or to how the current distance or angle are constraining the complementary range of available angles or distances.

Hence a first warning threshold may be that the distance cannot be so far away that θ is made less than an angular_leeway_threshold $T_{AL}$. A non-limiting example value of $T_{AL}$ is 20°, but may equally be 10°, 5° or any angle considered suitable by a designer (for example where a game associated with the book instructs use of the book on the floor, the need for angular leeway may be much less than when the game instructs the user to hold the book in their hands).

A second warning threshold may be that the angle cannot be so small that the marker is unable to move any further from the camera than an operating_distance_threshold $T_{OD}$. A non-limiting example value of $T_{OD}$ is 1 meter, but may equally be 0.5 or 0.1 meters, or any additional distance considered suitable by a designer.

Consequently for each of these cases, values constMaxAngle and constMaxDist can be readily defined for values at these thresholds.

As noted previously, it is also necessary to check whether the marker is also at the frustrum boundary (shown previously in FIGS. 7A-C as dashed lines 756T,B).

Whilst fiduciary markers with internal redundancy (allowing recognition from a partial marker) are considered within the scope of the present invention, it is preferable to assume that the fiduciary marker should be fully visible in the captured image.

Consequently it is preferable to assume that if the fiduciary marker centre is within d/2 (radius of the marker) of one of the clipping planes of the frustrum, then detection will fail. A more conservative assumption is if the fiduciary marker is within 0.71d of the clipping frame, to account for diametric positioning with respect to the frustrum. Again, which threshold to use may be selected by a designer.

Consequently the limits of movement within the viewing frustrum can be defined in terms of the x,y position in the viewing plane, where (0,0) is the centre of the plane, as follows:

maxXDisp(d, v)
maxYDisp(d, v)

These functions define the maximum distance the fiduciary marker can move in x and y from the centre of the viewing plan before hitting the clipping planes.

As with the distance and angle, it is then desirable to set a warning threshold for position within the image frame that allows some consequent movement. Hence a third warning threshold may be that the fiduciary marker can only be moved further in one of the x or y directions by viewing_position_leeway $T_{VP}$. A non-limiting example value of $T_{VP}$ is 30 cm, but again may for example be 15 cm or 5 cm, as applicable.

Consequently for this case, the value constMinDist can be readily defined for values at the x, y thresholds.

The above considerations can then be brought together to define a failure boundary defining the space in which operation of the book in its current orientation is preferred.

Hence in an embodiment of the present invention, the fiduciary marker should be greater than or equal to $M_s$ pixels in the captured image. The marker's state can be characterised as being:

in a viewing plane which is v meters from the camera,
at an angle θ to the viewing plane,
d meters in diameter, and
centred at a co-ordinate (x,y) in meters in the viewing plane The marker is then inside the absolute failure boundary if the following conditions are true:

θ<maxAngle($M_s$, d, v)
v<maxDist($M_s$, d, θ)
x>maxXDisp(d, v)
y>maxYDisp(d, v)

Moreover the marker is inside the practical failure boundary (i.e. where some further movement becomes difficult to keep within the absolute failure boundary) if the following conditions are also true:
θ<constMaxAngle
v<constMaxDist
v>constMinDist The marker's distance to one of these boundaries (in terms of degrees and/or meters) can be approximated by calculating the distance to each of the boundaries above and taking the minimum. Hence for example:

angleDist=min(constMaxAngle−θ,maxAngle($M_s$,d,v)−θ)

In this manner, a warning boundary for the current position and relative angle of the book with respect to the camera can be defined.

Figure 9:
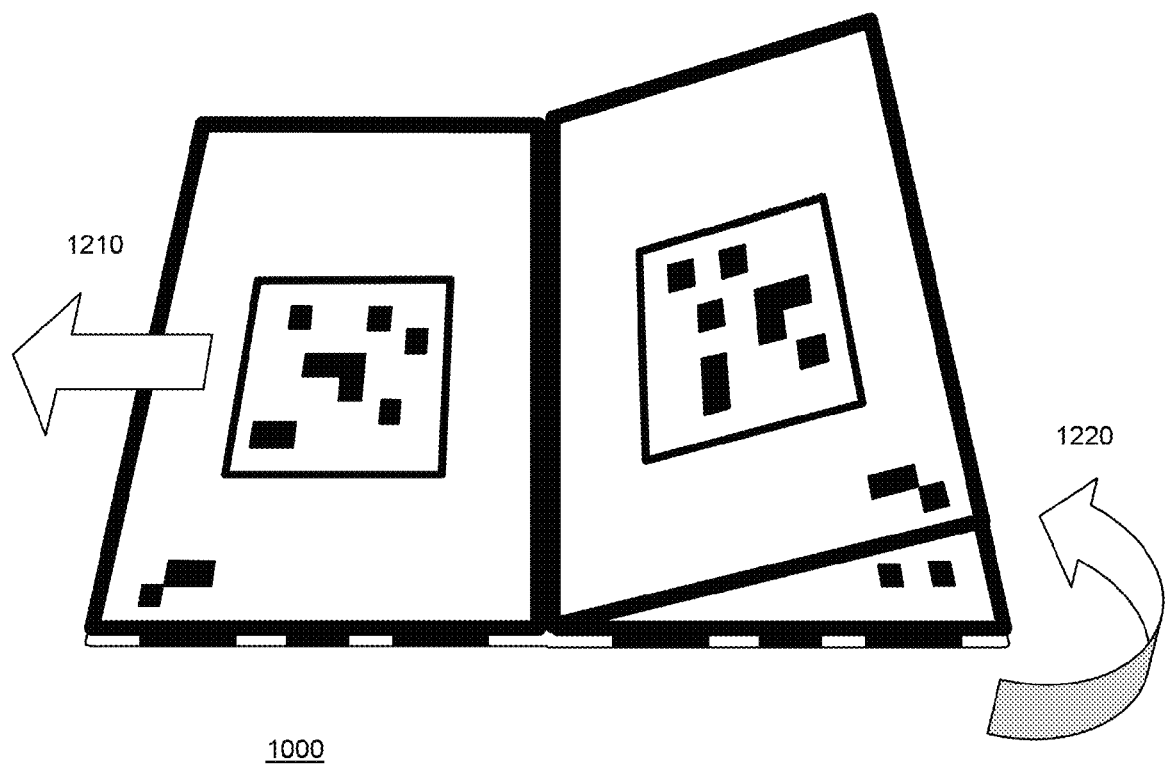
FIG. 9 is a schematic diagram of an augmented image of a book, in accordance with an embodiment of the present invention.

Referring now to FIG. 9, in response to the book's position and/or angle reaching this warning boundary, the graphical augmentation of the captured image can be modified or further augmented to inform the user that further movement into the boundary will result in recognition failure for the fiduciary markers. Hence for example arrows may be used, with linear arrows 1210 pointing in a corrective direction for positional movement, and/or curved arrows 1220 to suggesting corrective rotation for angular movement.

Other graphical indicators are also envisaged, such as a coloured tint appearing at the edge of the augmented image to indicate a direction in which further movement is not encouraged.

Similarly, the brightness of the augmented image may be made to reduce as the book reaches closer to the failure boundary, so that the image fades to black (or simply dark, still enabling the user to see the book for visual feedback purposes) over the region between the warning boundary and failure boundary. The user can then reposition the book to brighten the augmented image, thereby moving back out of this region.

Similarly, augmented characters in the game can indicate when the book is moving through the warning boundary, for example by jumping up and down and pointing in a corrective direction.

Finally of course, an audio message may be played suggesting a corrective action to the user.

Hence more generally, the system may indicate a warning to the user that the marker has reached the warning boundary, and may indicate an appropriate corrective motion to take the marker back inside that boundary (i.e. inside the operational space 1600).

As noted above, different angles and distances may be selected by a designer to define the width of the warning boundary adjacent to the failure boundary. In one embodiment, the angles and distances are chosen so that the amount of effort required to traverse the boundary is roughly equal in all circumstances (i.e. the amount of physical exertion required to move the book from the failure boundary to the edge of the warning boundary is roughly the same everywhere on that boundary).

Variants

The above scheme is based upon boundaries that are defined with respect to the imaging plane of the camera, and corrective movements are with respect to the camera. This may be counterintuitive, particularly for younger players. It would be preferable to define the corrective movements for display relative to the real world.

Hence in an embodiment of the present invention, as noted previously the shape of the boundary in 2D (ignoring, for a moment, the frustrum) is a circle. Using the terminology above, the diameter of the circle is $$C_d = \frac{hd}{M_s c}$$

which as noted previously is the maximum distance at which the marker can be resolved from the camera.

The centre of the circle, $C_c$, can be obtained by taking the unit normal of the marker (facing up from the pattern), $N_m$ and calculating $$C_c = CamPos - \left(\frac{C_d}{2}\right)N_m$$

This defines the centre $C_c$ and a diameter $C_d$ which in turn defines the circle which is the safe zone for the marker for some constant world angle.

To set a warning zone 10 cm from this boundary, for example, the radius of this circle is simply reduced by 10 cm.

For the calculations of failure boundaries and warning boundaries described herein, in an embodiment of the present invention the Cell processor is operable as a failure boundary calculation processor and a warning boundary calculation processor.

Summary Embodiment

In a summary embodiment of the present invention, an entertainment device such as the PS3 (10) comprises an input (for example USB port 710) operable to receive a captured image from a video camera (756). A marker detector (e.g. the Cell processor 100) is operable to detect a fiduciary marker within the captured image, and operable to estimate a distance and angle of the fiduciary marker. A failure boundary calculation processor (e.g. the Cell processor 100) is operable to calculate at least one of an additional distance and an additional angle from the currently estimated distance and angle of the fiduciary marker at which recognition of the fiduciary marker is assumed to fail. This assumption can be based upon the point at which the fiduciary marker will be resolved in the captured image at a resolution empirically determined (or calculated) to have a recognition failure rate that is deemed unacceptable.

In an instance of this summary embodiment, the failure boundary comprises the video camera frustrum (756B,T) and the circumference of a circle or sphere 1500 having a diameter equal to the maximum distance at which the fiduciary marker can be recognised, the circle circumference intersecting the image plane of the video camera and having an angle with respect to the image plane of the video camera that is the same as that of the fiduciary marker.

Hence the operable region (1600, 1600') for the marker is the region within the frustrum of the camera and between the camera and the circumference of this circle, as illustrated for example in FIGS. 7B and 7C.

In an instance of the summary embodiment, the operable region is equivalently defined by the inequalities
θ<maxAngle($M_s$, d, v),
v<maxDist($M_s$, d, θ),
x>maxXDisp(d, v), and
y>maxYDisp(d, v),
where θ is the angle of the fiduciary marker normal to the camera image plane, $M_s$ is the minimum recognisable size of the fiduciary marker in pixels, d is the width or diameter of the fiduciary marker, v is the distance between the fiduciary marker and the camera, and x and y are coordinates centred in the camera viewing plane, and where maxXDisp and maxYDisp define the maximum x and y values of the camera frustrum, maxAngle is the maximum angle relative to the camera of the fiduciary marker permitted for the presently estimated distance, and maxDist is the maximum distance from the camera of the fiduciary marker permitted for the presently estimated angle.

In an instance of the summary embodiment, an operable region is defined with respect to a secondary boundary based upon the failure boundary and further defined by the inequalities θ<constMaxAngle
v<constMaxDist
v>constMinDist where for the current position and angle of the marker, constMaxAngle defines a predetermined angular freedom of motion for the fiduciary marker within the failure boundary, constMaxDist defines a predetermined available additional distance for the fiduciary marker from the camera to the failure boundary, and constMinDist defines a predetermined available additional distance for the fiduciary marker to the edge of the camera frustrum.

For the case of any version of the operable region, in an instance of the summary embodiment a warning boundary calculation processor is operable to calculate whether the currently estimated distance and angle of the marker lies within at least one of a threshold distance and threshold angle from the respective boundary.

These thresholds may for example be arranged to represent a similar level of effort in restoring the marker from the failure boundary or the secondary boundary to the operable region inside the warning boundary. It will also be appreciated that for the failure boundary, the thresholds may be adapted to provide some or all similar additional constraints on the warning boundary to those resulting from use of the secondary boundary.

In an instance of the summary embodiment, an image augmentation processor (for example the Cell processor 100 and/or the reality synthesiser 200) is operable to augment the captured image responsive to whether the fiduciary marker is calculated to lie within the warning boundary. For example, the image augmentation processor may indicate a restorative motion of the fiduciary marker that would take the fiduciary marker back out of the warning boundary.

Figure 10:
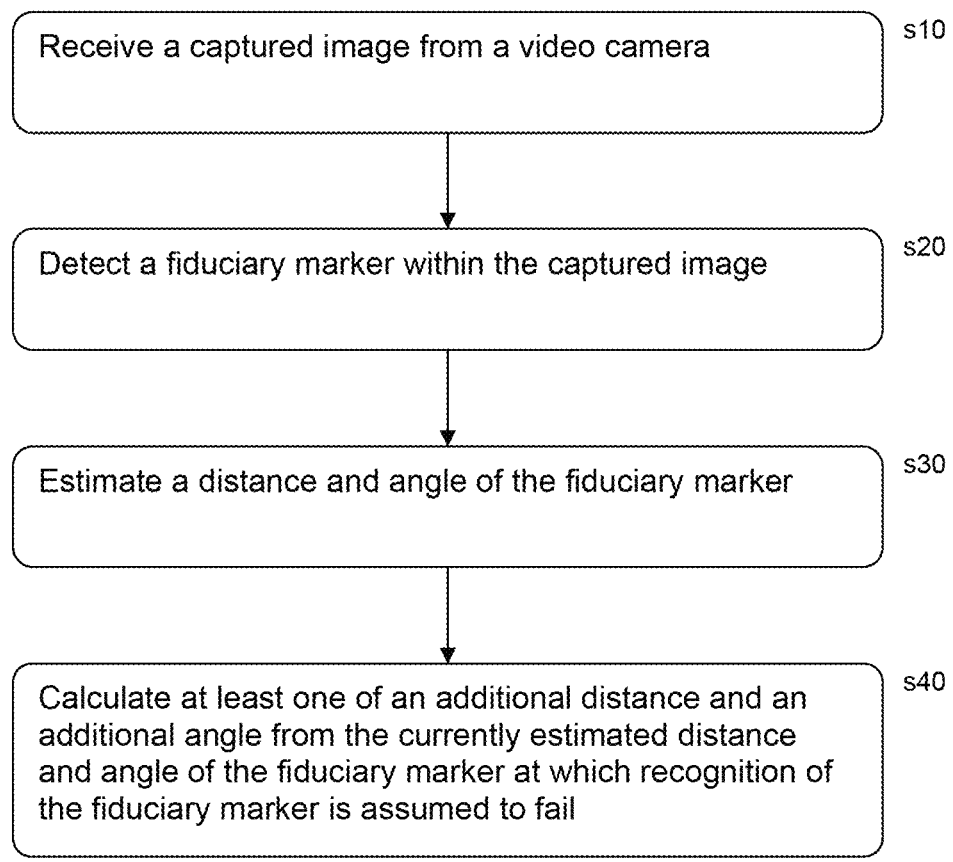
FIG. 10 is a flow diagram of a method of object positioning, in accordance with an embodiment of the present invention.

Referring now to FIG. 10, a corresponding method of object positioning comprises:
  in a first step s10, receiving a captured image from a video camera;
  in a second step s20, detecting a fiduciary marker within the captured image;
  in a third step s30, estimating a distance and angle of the fiduciary marker; and
  in a fourth step s40, calculating at least one of an additional distance and an additional angle from the currently estimated distance and angle of the fiduciary marker at which recognition of the fiduciary marker is assumed to fail.

It will be apparent to a person skilled in the art that variations in the above method corresponding to operation of the various embodiments of the apparatus as described and claimed herein are considered within the scope of the present invention, including but not limited to:
  the failure boundary comprising the video camera frustrum and a circle having a diameter equal to the maximum distance at which the fiduciary marker can be recognised, the circle intersecting the image plane of the video camera and having an angle with respect to the image plane of the video camera that is the same as that of the fiduciary marker;
  a region inside the failure boundary being defined by the inequalities θ<maxAngle($M_s$, d, v), v<maxDist($M_s$, d, θ), x>maxXDisp(d, v), and y>maxYDisp(d, v), as described herein,
  and a secondary boundary being further defined by the inequalities θ<constMaxAngle, v<constMaxDist, and v>constMinDist, as described herein;
  calculating the extent of a warning boundary being at least one of a threshold distance and threshold angle from the failure boundary or the secondary, and
  calculating whether either of the currently estimated distance and angle of the fiduciary marker lies beyond that warning boundary; and
  augmenting the captured image responsive to whether the fiduciary marker is calculated to lie within a warning boundary being at least one of a threshold distance and threshold angle from the failure boundary, and
  indicating a restorative motion of the marker that would take the fiduciary marker back out of the warning boundary.

Finally, as noted previously herein, the Cell processor or other processors of the PS3 may adopt roles within the above described apparatus and method when operating under suitable software instruction.

Hence it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) to or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:
1. An entertainment device, comprising:
an input operable to receive a captured image from a video camera;
a marker detector operable to detect a fiduciary marker within the captured image, and operable to estimate a distance and angle of the fiduciary marker; and
a failure boundary calculation processor operable to calculate at least one of an additional distance and an additional angle from the estimated distance and angle of the fiduciary marker as a failure boundary at which recognition of the fiduciary marker is assumed to fail;

in which the failure boundary comprises a video camera frustrum and a circle having a diameter equal to a maximum distance at which the fiduciary marker can be recognised, the circle intersecting an image plane of the video camera and having an angle with respect to the image plane of the video camera that is the same as that of the fiduciary marker.

2. An entertainment device according to claim 1, comprising:
a warning boundary calculation processor operable to calculate whether the estimated distance and angle of the marker lies within at least one of a threshold distance and threshold angle from the failure boundary.

3. An entertainment device according to claim 2, comprising
an image augmentation processor operable to augment the captured image responsive to whether the fiduciary marker is calculated to lie within the warning boundary.

4. An entertainment device according to claim 3, in which the image augmentation processor indicates a restorative motion of the fiduciary marker that would take the fiduciary marker back out of the warning boundary.

5. A method of object positioning, comprising the steps of:
receiving a captured image from a video camera;
detecting a fiduciary marker within the captured image;
estimating a distance and angle of the fiduciary marker; and
calculating at least one of an additional distance and an additional angle from the estimated distance and angle of the fiduciary marker as a failure boundary at which recognition of the fiduciary marker is assumed to fail;
in which the failure boundary comprises a video camera frustrum and a circle having a diameter equal to a maximum distance at which the fiduciary marker can be recognised, the circle intersecting an image plane of the video camera and having an angle with respect to the image plane of the video camera that is the same as that of the fiduciary marker.

6. A method according to claim 5, further comprising calculating whether either of the estimated distance and angle of the fiduciary marker lies within at least one of a threshold distance and threshold angle from the failure boundary.

7. A method according to claim 5, further comprising augmenting the captured image responsive to whether the fiduciary marker is calculated to lie within a warning boundary being at least one of a threshold distance and threshold angle from the failure boundary.

8. A method according to claim 7, further comprising indicating a restorative motion of the marker that would take the fiduciary marker back out of the warning boundary.

9. A non-transitory computer program product comprising computer program instructions that when performed by a processor implement a method comprising the steps of:
receiving a captured image from a video camera;
detecting a fiduciary marker within the captured image;
estimating a distance and angle of the fiduciary marker; and
calculating at least one of an additional distance and an additional angle from the estimated distance and angle of the fiduciary marker as a failure boundary at which recognition of the fiduciary marker is assumed to fail;
in which the failure boundary comprises a video camera frustrum and a circle having a diameter equal to a maximum distance at which the fiduciary marker can be recognised, the circle intersecting an image plane of the video camera and having an angle with respect to the image plane of the video camera that is the same as that of the fiduciary marker.

* * * * *